No. 788,753. PATENTED MAY 2, 1905.
W. A. CLORE.
FEED TROUGH.
APPLICATION FILED AUG. 23, 1904.
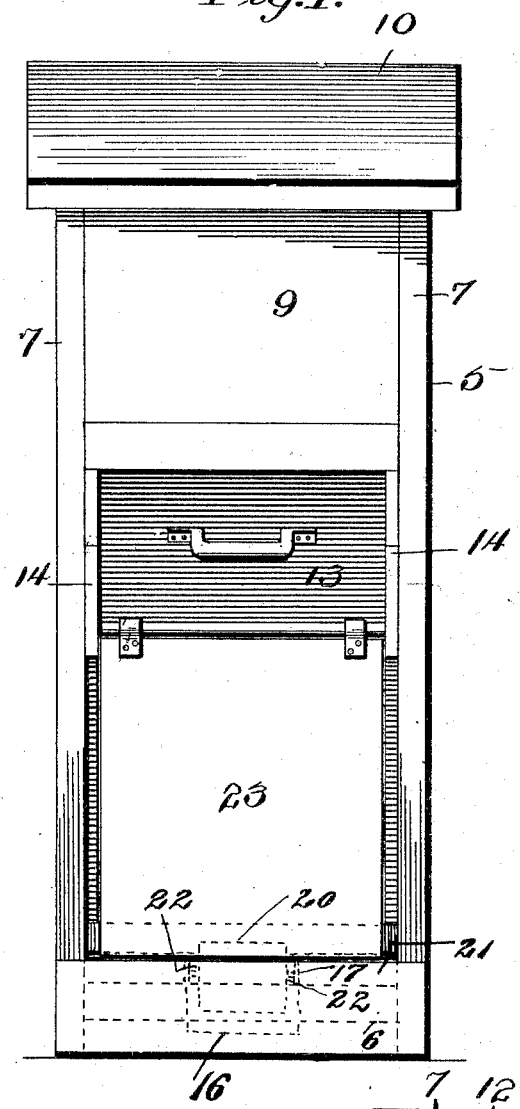
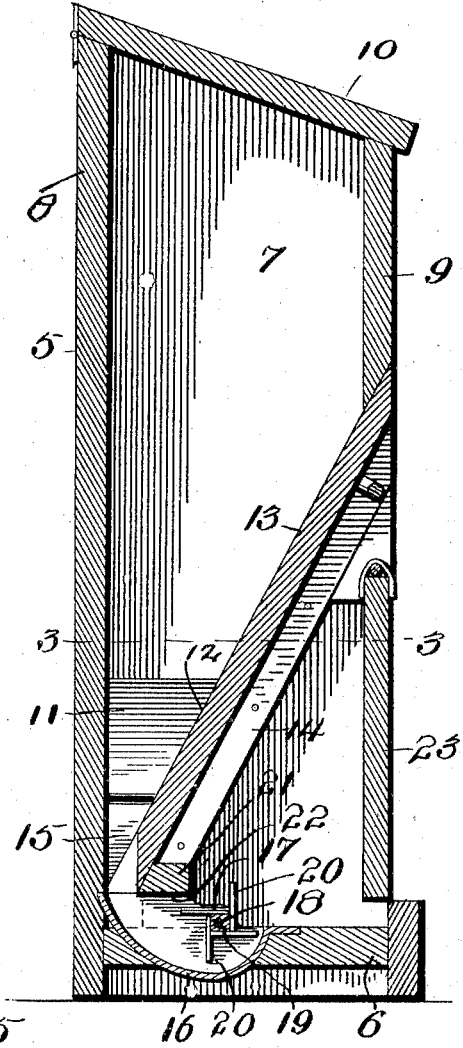
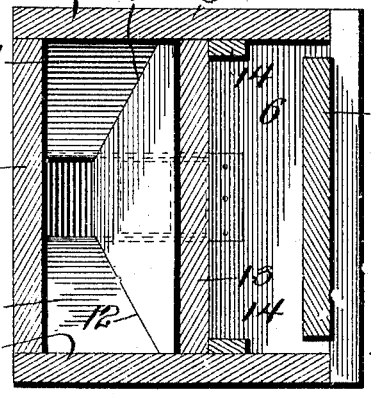
WITNESSES:
INVENTOR
Wm A. Clore
BY
Philo B. Stevens & Co.
Attorneys No. 788,753. Patented May 2, 1905.

UNITED STATES PATENT OFFICE.

WILLIAM ALLEN CLORE, OF LOVINGTON, ILLINOIS.

FEED-TROUGH.

SPECIFICATION forming part of Letters Patent No. 788,753, dated May 2, 1905.

Application filed August 23, 1904. Serial No. 221,854.

*To all whom it may concern:*

Be it known that I, WILLIAM ALLEN CLORE, a citizen of the United States, residing at Lovington, in the county of Moultrie and State of Illinois, have invented new and useful Improvements in Feed-Troughs, of which the following is a specification.

My invention relates to a feed-trough more particularly for hogs; and it consists in certain novel features of construction hereinafter described and claimed.

In the accompanying drawings, Figure 1 is a front elevation, and Fig. 2 is a vertical section thereof. Fig. 3 is a horizontal section on the line 3 3 of Fig. 2.

Referring specifically to the drawings, the invention consists in a box 5, having a floor or bottom 6, sides 7, rear end 8, and front end 9. The latter is partly open to permit access to the feed device, to be hereinafter described. The top of the box is closed by a hinged lid 10, which is made sloping in order to shed rain. Inside of the box are secured blocks 11, which fit against the rear and end walls. The inner faces 12 of these blocks slope inwardly, as shown, and with the board 13 form a hopper for the feed. The board 13 extends from the front end of the box and slopes rearwardly. It fits between the front ends of the blocks 11 and cleats 14, secured to the side walls 7. The blocks 11 have at their lower ends downward extensions 15, which form a spout. At 16 is indicated a trough which fits in an opening made in the floor of the box. The rear end of the trough is under the spout 15 and receives the feed therefrom. The top edge of the trough near its front end has upwardly-extending ears 17, in which a shaft 18 is journaled, said shaft carrying the feed-delivery wheel. This wheel comprises a hub 19, from which a number of wings 20 extend outwardly. A sill 21 extends across the floor of the box, which sill has an opening 22 for the feed-delivery wheel. This construction protects the feed in the trough, as it cannot be reached by the animal, except as hereinafter described.

To protect the device from chickens and other fowls, the opening in the front of the box is covered by a swinging door 23, which is hung at the top from a horizontal rod extending between the sides of the box. This door can be readily swung open by the hog, but is too heavy to be opened by a fowl.

The operation of the device is obvious. The animal pushes the door 23 open and turns the feed-delivery wheel, which scoops up or delivers the feed from the trough 16. It will be noted that the trough extends below the floor of the box and the wings of the feed-delivery wheel extend downwardly into the trough, so that if any part of the feed which is scooped up is not eaten it will be dropped back into the trough. Therefore if the animal has a disposition to root for every mouthful the feed-delivery wheel will drop back into the trough any excess of feed delivered and it will not be spilled over the floor of the box. The trough is deepest immediately under the feed-delivery wheel, so that there will always be a supply of feed thereunder as long as the hopper is filled. The front board 13 can be readily removed to inspect the inside of the box.

By reason of the construction above described there will be a saving of feed, as all that is not eaten by the animal will be dropped back into the trough. The feed in the trough and hopper is also fully protected from dirt to prevent it from being spoiled.

What I claim as new, and desire to secure by Letters Patent, is—

1. A feeding device comprising a box having an opening in front, a feed-hopper in the box, a trough thereunder, a feed-delivery wheel in the trough, and a swinging door over the opening in the box in front of the delivery-wheel.

2. A feeding device comprising a box containing a hopper, a trough thereunder extending below the floor of the box, and a feed-delivery wheel extending into the trough.

3. A feeding device comprising a box, a trough therein extending below the floor of the box, a feed-hopper discharging into the rear end of the trough, and a feed-delivery wheel extending into the front end of the trough.

4. A feeding device comprising a box having an opening in front, a trough in the box extending below the floor thereof, a feed-hopper discharging into the rear end of the trough, a feed-delivery wheel extending into the front end of the trough, and a swinging door over the opening in the box in front of the delivery-wheel.

In testimony whereof I have signed my name to this specification in the presence of two subscribing witnesses.

WILLIAM ALLEN CLORE.

Witnesses:
A. R. PIFER,
A. HOOTS.